United States Patent
Corson et al.

(10) Patent No.: US 8,130,298 B2
(45) Date of Patent: Mar. 6, 2012

(54) WIDE DYNAMIC RANGE IMAGE SENSOR UTILIZING SWITCH CURRENT SOURCE AT PRE-DETERMINED SWITCH VOLTAGE PER PIXEL

(75) Inventors: Phillip L. Corson, Westford, VT (US); Mete Erturk, Alburg, VT (US); Ezra D. B. Hall, Richmond, VT (US); Paul A. Niekrewicz, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 1064 days.

(21) Appl. No.: 12/027,283

(22) Filed: Feb. 7, 2008

(65) Prior Publication Data

US 2009/0201394 A1 Aug. 13, 2009

(51) Int. Cl.
*H04N 3/14* (2006.01)
*H04N 5/335* (2006.01)

(52) U.S. Cl. ........................... 348/301; 348/294

(58) Field of Classification Search .......... 348/294, 348/301, 364
See application file for complete search history.

(56) References Cited

U.S. PATENT DOCUMENTS

| | | | |
|---|---|---|---|
| 5,075,778 A | 12/1991 | Saito | |
| 5,739,871 A | 4/1998 | Kim | |
| 5,889,605 A * | 3/1999 | Claverie et al. | 398/202 |
| 6,130,423 A * | 10/2000 | Brehmer et al. | 250/208.1 |
| 6,169,808 B1 | 1/2001 | Kim | |
| 6,469,740 B1 * | 10/2002 | Kuroda et al. | 348/308 |
| 6,999,122 B1 | 2/2006 | Hagihara et al. | |
| 2004/0135913 A1* | 7/2004 | Shinotsuka et al. | 348/308 |
| 2004/0196397 A1* | 10/2004 | Beck et al. | 348/308 |
| 2004/0227109 A1 | 11/2004 | Storm et al. | |
| 2004/0227831 A1 | 11/2004 | Storm et al. | |
| 2005/0057675 A1* | 3/2005 | Lee et al. | 348/308 |
| 2005/0280713 A1 | 12/2005 | Hagihara et al. | |
| 2009/0091648 A1* | 4/2009 | Lin et al. | 348/301 |

OTHER PUBLICATIONS

Otim, et al., "Modelling of High Dynamic Range Logarithmic CMOS Image Sensors," IMTC 2004—Instrumentation and Measurement Technology Conference, IEEE, 2004, pp. 451-456.

Joseph, et al., "Modeling, Calibration, and Correction of Nonlinear Illumination-Dependent Fixed Pattern Noise in Logarithmic CMOS Image Sensors," IEEE Transactions on Instrumentation and Measurement, vol. 51, No. 5, Oct. 2002, pp. 996-1001.

Lin, et al., "A High Dynamic Range CMOS Image Sensor Design Based on Two-Frame Composition," 4 pages, (Sep. 2003).

Yadid-Pecht, et al., "Wide Intrascene Dynamic Range CMOS APS Using Dual Smpling," IEEE Transaction on Electron Devices, vol. 44, No. 10, Oct. 1997, pp. 1721-1723.

(Continued)

*Primary Examiner* — Hung Lam
(74) *Attorney, Agent, or Firm* — Gibb I.P. Law Firm, LLC

(57) ABSTRACT

Disclosed are embodiments of a pixel imaging circuit that incorporates a standard photodiode. However, the imaging circuit is modified with a feedback loop to provide a first photo response over a first portion of the light sensing range (e.g., at higher light intensity range) and a second reduced-sensitivity photo response over a second portion of the light sensing range (i.e., at a lower light intensity range), thereby extending the circuits dynamic range of coverage. Also disclosed are embodiments of an associated imaging method and a design structure that is embodied in a machine readable medium and used in the imaging circuit design process.

20 Claims, 9 Drawing Sheets

OTHER PUBLICATIONS

Fish, et al., WDR Snapshot APS for Ultra Low-Power Applications, (Nov. 2005).

Stoppa, et al., "Novel CMOS Image Sensor With 132-dB Dynamci Range", (Dec. 2002).

* cited by examiner

WIDE DYNAMIC RANGE IMAGE SENSOR UTILIZING SWITCH CURRENT SOURCE AT PRE-DETERMINED SWITCH VOLTAGE PER PIXEL

BACKGROUND OF THE INVENTION

The embodiments of the invention generally relate to imaging circuits and, more particularly, are direct to an improved imaging circuit capable of detecting an extended dynamic range of light intensity levels, a design structure for such a circuit and an associated imaging method.

DESCRIPTION OF RELATED ART

Currently, digital and film cameras do not have imaging sensors capable of detecting a wide enough dynamic range of light intensity levels. Dynamic range refers to the ability to see both dim and bright lights within the same scene. Specifically, the human eye can detect light levels over a 1,000,000,000:1 absolute dynamic range (i.e., from fully adapted dark vision to fully adapted full sunlight/snow vision). At typical daylight lighting levels, the human eye can discern light contrast levels within a given scene over 30,000:1 dynamic range. Unfortunately, current imaging circuits on high-end (i.e., professional-grade) digital and film cameras are limited to a 2,000:1 dynamic range (i.e., a factor of 10 lower than the human eye). Furthermore, typical imaging circuits on consumer-grade digital cameras are limited to a 400:1 dynamic range (i.e., a factor of 100 lower than the human eye). The limited dynamic range of professional and consumer-grade cameras results in compromised images. That is, when photographs are taken the exposure is set, either manually or automatically, to either the dark or the bright areas within a scene. This result in either fully saturated white regions or featureless black regions. Outdoor scenes are particularly sensitive to this phenomenon. Potential solutions developed to date still fall short of the human eye's abilities and/or require a significant amount of post-processing on a computer. Consequently, there is a need in the art for an imaging circuit and method that provides an extended dynamic range and further that can easily be rolled down to lower-end consumer markets with economies of scale.

BRIEF SUMMARY OF THE INVENTION

In view of the foregoing, disclosed herein are embodiments of a pixel imaging circuit that incorporates a standard photodiode. However, the imaging circuit is modified with a feedback loop to provide a first photo response over a first portion of the light sensing range (e.g., at a lower light intensity range) and a second reduced-sensitivity photo response over a second portion of the light sensing range (i.e., at a higher light intensity range), thereby extending the circuit's dynamic range of coverage. Also disclosed are embodiments of an associated imaging method and a design structure that is embodied in a machine readable medium and used in the imaging circuit design process.

More particularly, disclosed herein are embodiments of a pixel imaging circuit. The pixel imaging circuit can comprise a photodiode. As with the photodiode in a conventional imaging circuit, the photodiode in the imaging circuit of the present invention is adapted to convert light energy into electric current. Specifically, the photodiode is electrically connected to a supply voltage via a reset switch, which, when on, allows the photodiode to be charged. When the reset switch is off and the photodiode is exposed to light, the photodiode discharges, thereby converting the light energy into electric current with the output voltage of the photodiode being inversely proportional to the intensity of that light energy over the integration period. However, unlike prior art imaging circuits, the present imaging circuit is modified to include a feedback loop which allows the photodiode to exhibit different responses at different light intensity ranges.

More specifically, the present imaging circuit incorporates a feedback loop that applies a constant current to the photodiode, only when the output voltage of the photodiode is below a predetermined reference voltage in order to reduce the sensitivity of the photodiode response at higher light intensity levels. To accomplish this, the feedback loop comprises a comparator electrically connected to the photodiode and to a predetermined reference voltage. The comparator is adapted to receive the electric current output from the photodiode and to compare the voltage of that electric current with the predetermined reference voltage. That is, the comparator is adapted to determine whether or not the output voltage from the photodiode is less than the predetermined reference voltage. The feedback loop further comprises a current source connected to the photodiode by a switch, which in turn is controlled by the output of the comparator. This switch is adapted to control the flow of a constant current from the current source to the photodiode. Specifically, if the switch is turned on a constant current will be supplied to the photodiode and if the switch remains off no current will be supplied to the photodiode. Thus, if the output voltage of the photodiode is determined by the comparator to be at or above the reference voltage, the switch will remain off preventing a constant current from flowing to the photodiode. Without the constant current, the photodiode will reduce the output voltage in response to the intensity of the light energy at a first rate (i.e., the photodiode will discharge at a first rate). However, if the output voltage of the photodiode is determined by the comparator to be below the reference voltage, the switch will turn on allowing a constant current to flow to the photodiode. With the constant current, the photodiode rate of discharge is reduced. Thus, the photodiode will reduce the output voltage in response to the intensity of the light energy at a second rate that is different from the first rate and, more specifically, that is less than the first rate. Consequently, the sensitivity of the photodiode is greater within a first range of light intensities (i.e., to lower intensity light) than within a second range of light intensities that is greater than the first range (i.e., to higher intensity of light). That is, the sensitivity of the photodiode is reduced with higher light intensities. This second rate prevents saturation of the photodiode within the second range of light intensities during the integration period and, thereby, extends the dynamic range of the imaging circuit.

In addition to the features described above, the photodiode can be configured such that the first rate is lower than the rate of discharge of the light energy. This will ensure that, once the switch is turned on by the comparator allowing current to flow to the photodiode, it will remain on. Furthermore, while the current applied to the photodiode by the feedback loop must be constant, the current source itself can be variable (i.e., it can be adapted to allow the constant current to be pre-set to a specified level, either manually or automatically, based on known lighting conditions or through light metering). Thus, the variable current source allows the second rate to be adjusted, as needed.

Also disclosed herein are embodiments of an associated imaging method. The method embodiments comprise converting light energy into electric current over an integration period. Specifically, a reset switch is activated to allow a supply voltage to charge a photodiode. The reset switch is then turned off and the photodiode is exposed to light energy, thereby discharging the photodiode and converting the light energy into electric current with the output voltage of the photodiode being inversely proportional to the intensity of that light energy. Next, the output voltage of the photodiode is compared to a predetermined reference voltage in order to determine whether the photodiode output voltage is less than the predetermined reference voltage. Then, when and only when the photodiode output voltage is less than the predetermined reference voltage, is a constant current applied to the photodiode. Without this constant current, the photodiode output voltage will be reduced in response to the intensity of the light energy at a first rate. However, with the constant current, the photodiode output voltage will be reduced in response to the intensity of the light energy at a second rate that is different from the first rate and, more specifically, that is less than the first rate. Consequently, the method provides for greater sensitivity within a first range of light intensities (i.e., to light of lower intensities) than within a second range of light intensities that is greater than the first range (i.e., to light of higher intensities). That is, the sensitivity of the photodiode is reduced with higher light intensities. This second rate prevents saturation of the photodiode within the second range of light intensities during the integration period.

The method embodiments can include several additional features. For example, method embodiments can include pre-selecting the photodiode so that the first rate is lower than a rate of discharge of the light energy to ensure that, once the constant current flows to the photodiode, the output voltage will remain below the predetermined reference voltage. The method embodiments can include automatically or manually pre-setting the constant current to a specified level based on known lighting conditions or through light metering, thereby allowing the second rate to be adjusted. Finally, after the integration period, a simple interpolation can be applied in order to normalize the output voltage in cases where it was reduced at the second rate.

Also disclosed herein are embodiments of a design structure embodied in a machine readable medium and used in a design process for designing the above-described imaging circuit. The design structure can reside on a storage medium as a data format used for the exchange of layout data of integrated circuits. Furthermore, this design structure can comprise a netlist (which describes the imaging circuit), test data files, characterization data, verification data, and/or design specifications.

These and other aspects of the embodiments of the invention will be better appreciated and understood when considered in conjunction with the following description and the accompanying drawings. It should be understood, however, that the following descriptions, while indicating embodiments of the invention and numerous specific details thereof, are given by way of illustration and not of limitation. Many changes and modifications may be made within the scope of these embodiments without departing from the spirit thereof, and the embodiments are intended to include all such changes and modifications.

BRIEF DESCRIPTION OF THE DRAWINGS

The embodiments of the invention will be better understood from the following detailed description with reference to the drawings, in which.

DETAILED DESCRIPTION OF EMBODIMENTS

Figure 1:
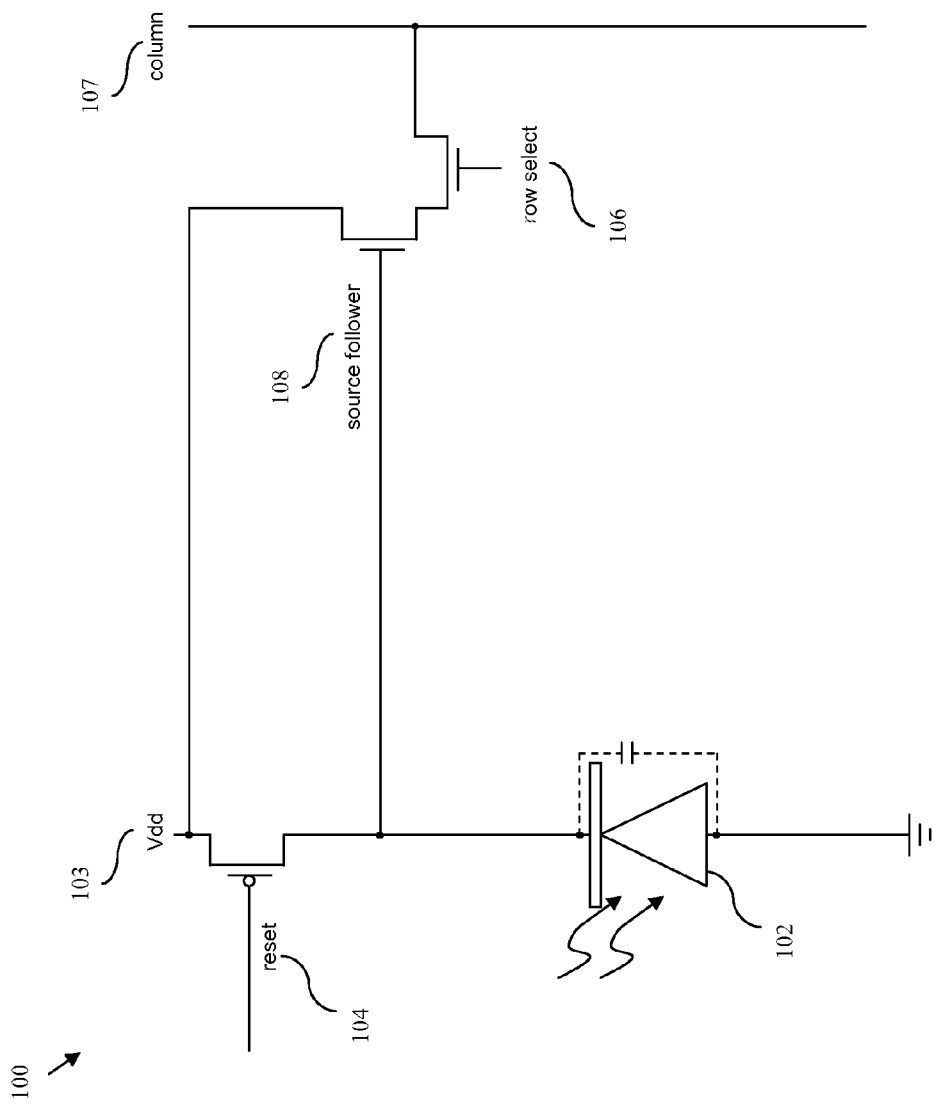
FIG. 1 is a schematic diagram illustrating an imaging circuit.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned above, digital and film cameras do not have imagining sensors that are capable of detecting a wide enough dynamic range of light intensity levels. Dynamic range refers to the ability to see both dim and bright lights within the same scene. Specifically, the human eye can detect light levels over a 1,000,000,000:1 absolute dynamic range (i.e., from fully adapted dark vision to fully adapted full sunlight/snow vision). At typical daylight lighting levels, the human eye can discern light contrast levels within a given scene over 30,000:1 dynamic range. Unfortunately, current imaging circuits on high-end (i.e., professional-grade) digital and film cameras are limited to a 2,000:1 dynamic range (i.e., a factor of 10 lower than the human eye). Furthermore, typical imaging circuits on consumer-grade digital cameras are limited to a 400:1 dynamic range (i.e., a factor of 100 lower than the human eye). The limited dynamic range of professional and consumer-grade cameras results in compromised images. That is, when photographs are taken the exposure is set, either manually or automatically, to either the dark or the bright areas within a scene. This result in either fully saturated white regions or featureless black regions. Outdoor scenes are particularly sensitive to this phenomenon.

Today's digital cameras typically comprise an array of imaging circuits. Each imaging circuit (see exemplary imaging circuit 100 of FIG. 1) corresponds to a pixel (i.e., the smallest discrete component) of a resulting picture or image. The imaging circuit 100 comprises a conventional photodiode 102 adapted to convert light energy into a response voltage after a specified period of time. Specifically, the photodiode 102 is electrically connected to a supply voltage 103 via a reset switch 104, which, when on (i.e., activated), allows the photodiode 102 to be charged. When the reset switch 104 is off (i.e., de-activated) and the photodiode is exposed to light over a specified period of time (i.e., the integration period during which the camera shutter is open), the photodiode discharges, thereby converting the light energy into electric current with the output voltage of the photodiode being inversely proportional to the integrated intensity of the light energy over the integration period. That is, the pixel voltage is reduced in accordance to the number of incident photons. At the end of the specified period of time, row select 106 is sequentially activated to readout one row at a time through columns 107, utilizing a source follower 108.

Figure 2:
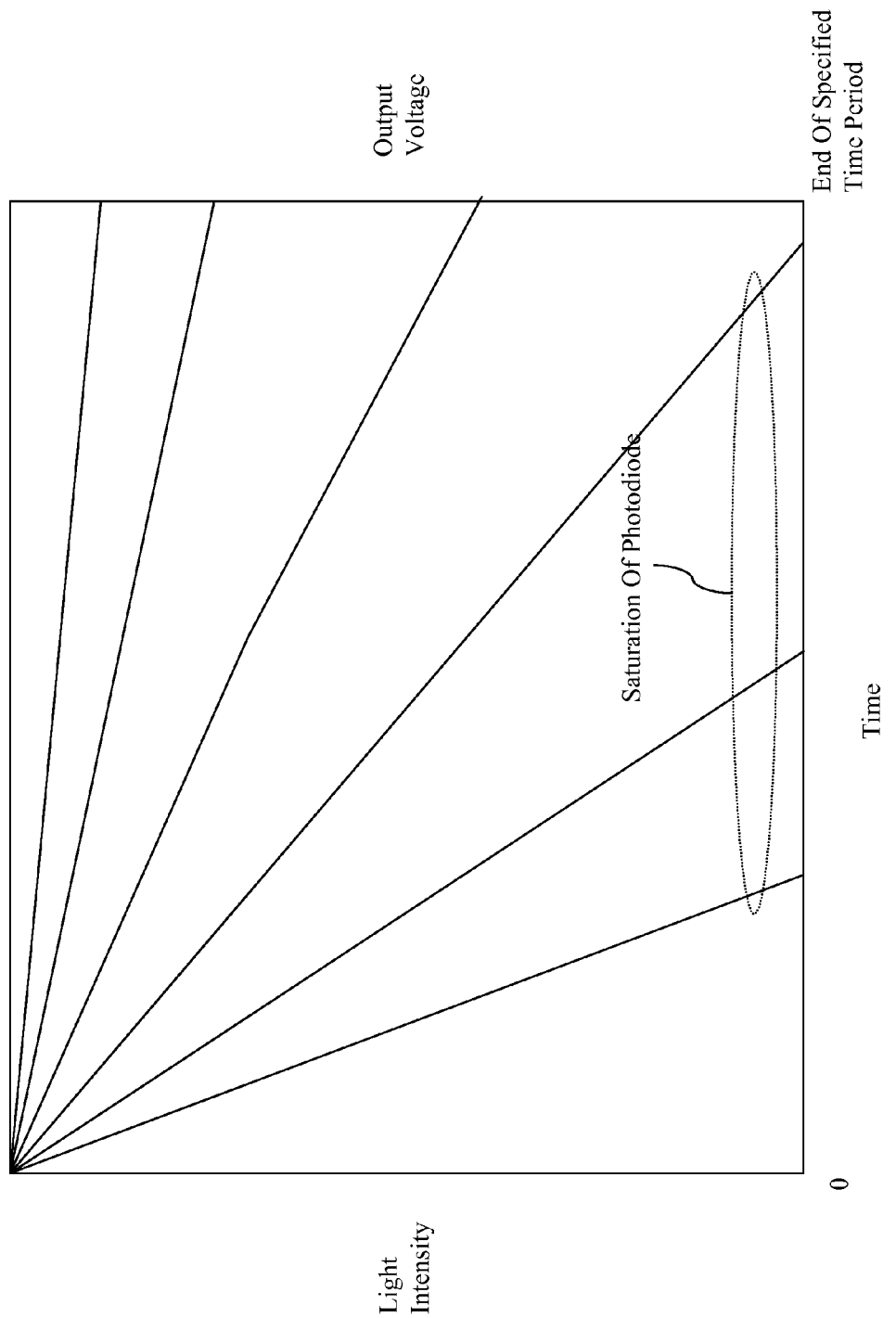
FIG. 2 is a chart illustrating the dynamic range of the imaging circuit of FIG. 1.

As illustrated in FIG. 2, the imaging circuit 100 of FIG. 1 will have the same response (i.e., will discharge at the same rate) regardless of the light intensity. Consequently, at higher light intensities, the photodiode will become saturated prior to the end of the specified time period (i.e., before the end of the integration period determine by the preset shutter speed). Many digital cameras now have built in histogram functions as well as sophisticated light metering schemes configured to find the best compromise exposure for any given scene to avoid such saturation. Unfortunately, these capabilities still fall short of the human eye's abilities.

Consequently, a broad range of other solutions have been offered to provide extended dynamic range for image sensors. For example, one proposed solution is to use photograph editing software in order to combine multiple still photographs, where each photograph is taken at a different light exposure setting. Specifically, this technique requires a tripod in order to acquire a still scene with no movement and a camera that allows for manual exposure adjustment. Two or more photographs are taken of exactly the same scene at varied light exposure settings. The multiple photographs are then processed with photograph editing software to combine the properly exposed dark areas of the scene as taken with a longer exposure (and/or larger aperture) and the properly exposed brighter areas of the scene as taken with the shorter exposure (and/or smaller aperture) in order to produce a combined single image with a higher effective dynamic range. This technique can be accomplished with currently available equipment, but requires a still camera and scene. It further requires a skilled operator and a laborious workflow with post-processing on a computer. Another technique incorporates logarithmic imaging circuits rather than linear imaging circuits. Specifically, digital cameras are usually configured with imaging circuits that exhibit an approximately linear response to light intensity levels. That is, if an imaging circuit incorporates a conventional photodiode image sensor, it will exhibit an inverse linear response (i.e., as light intensity increases, voltage will decrease). Logarithmic imaging circuits on the other hand exhibit a non-linear response to light intensity levels. For example, a logarithmic image sensor can exhibit a curved response that is highly sensitive to initial light integration, but that over time exhibits less sensitivity causing "compression" of the signal, thereby extending the dynamic range. Such logarithmic imaging circuits are not used commercially because a large variability from pixel to pixel can only be removed with extensive calibration and lookup tables. Given the various disadvantages of the above-described solutions, there is a need in the art for an imaging circuit and method that provides an extended dynamic range and further that can easily be rolled down to lower-end consumer markets with economies of scale.

In view of the foregoing, disclosed herein are embodiments of a pixel imaging circuit that incorporates a standard photodiode. However, the imaging circuit is modified with a feedback loop to provide a first photo response over a first portion of the light sensing range (e.g., at lower light intensity range) and a second reduced-sensitivity photo response over a second portion of the light sensing range (i.e., at a higher light intensity range), thereby extending the circuit's dynamic range of coverage. Also disclosed are embodiments of an associated imaging method and a design structure that is embodied in a machine readable medium and used in the imaging circuit design process.

Figure 3:
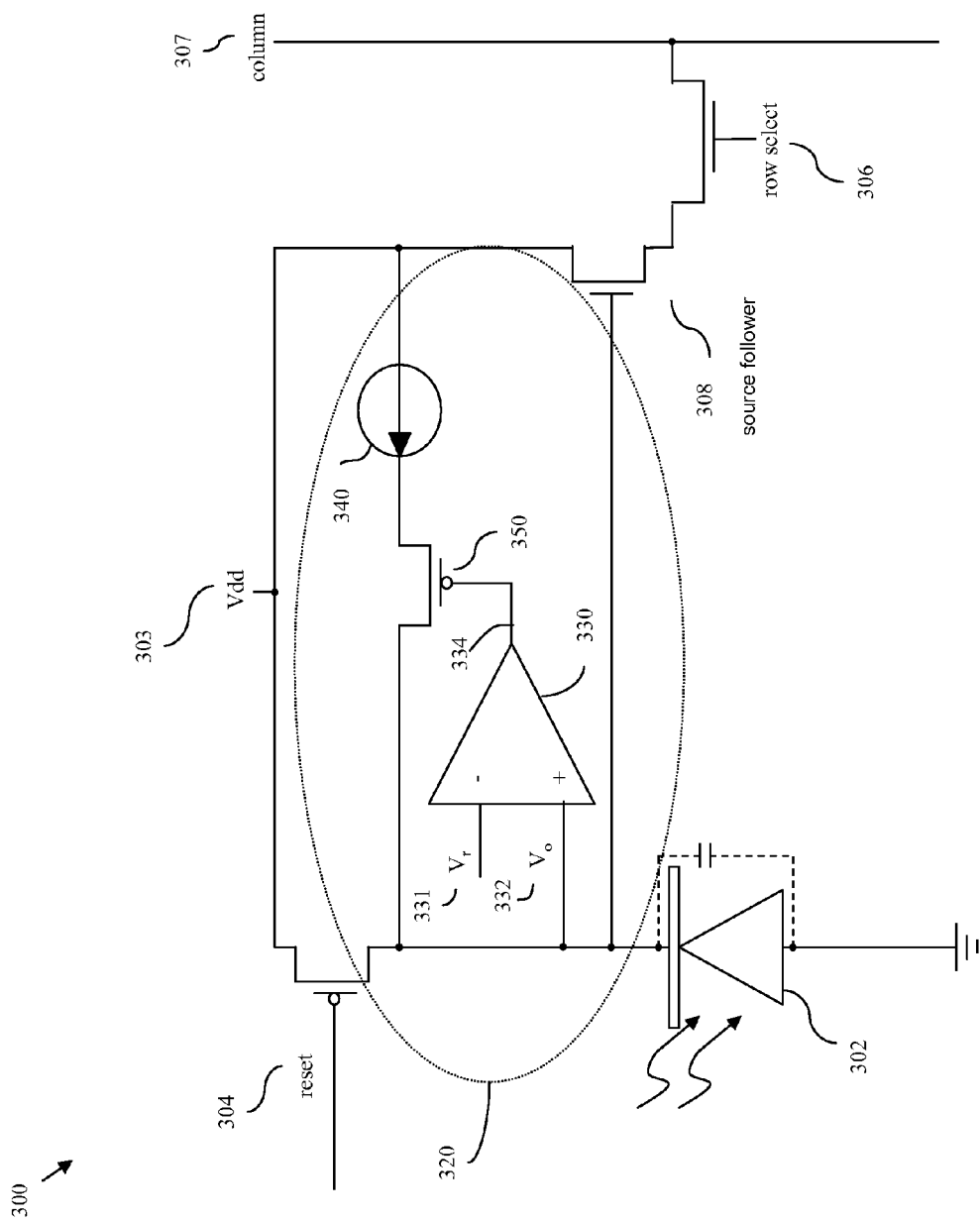
FIG. 3 is a schematic diagram illustrating an embodiment of the imaging circuit of the present invention.

More particularly, referring to FIG. 3, disclosed herein are embodiments of a pixel imaging circuit 300 that corresponds to a pixel of a resulting picture or image. The pixel imaging circuit 300 can comprise a photodiode 302. As with the photodiode in a conventional imaging circuit 100 of FIG. 1, the photodiode 302 in the imaging circuit 300 of the present invention is adapted to convert light energy into electric current. Specifically, the photodiode 302 is electrically connected to a supply voltage 303 via a reset switch 304, which, when on (i.e., activated), allows the photodiode 302 to be charged. When the reset switch 304 is off (i.e., de-activated) and the photodiode 302 is exposed to light over a specified period of time (i.e., over an integration period during which the camera shutter is open), the photodiode 302 discharges. The resulting output voltage 332 of the photodiode 302 is inversely proportional to the integrated intensity of the light energy for that pixel. That is, the pixel voltage is reduced in accordance to the number of incident photons. Again, at the end of the specified period of time (i.e., at the end of the integration period), row select 306 is sequentially activated to readout one row at a time through columns 307, utilizing a source follower 308. However, unlike prior art imaging circuits, the present imaging circuit 300 is modified to include a feedback loop 320 which allows the photodiode 302 to exhibit different responses at different light intensity ranges.

Figure 4:
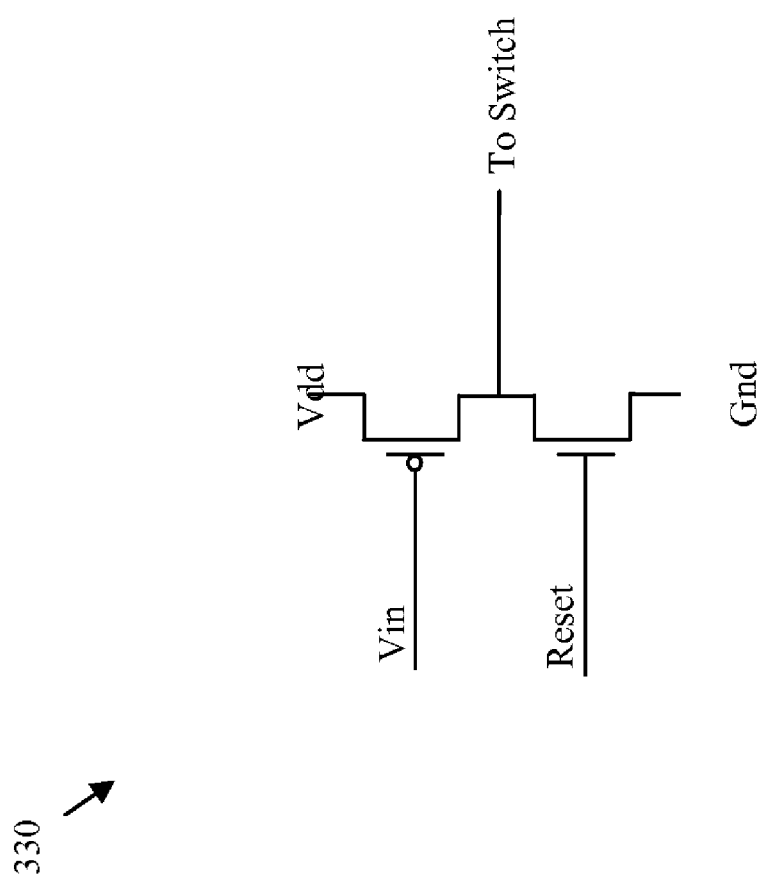
FIG. 4 is a schematic diagram illustrating an exemplary voltage comparator circuit that can be incorporated into the imaging circuit of FIG. 3.

More specifically, the present imaging circuit 300 incorporates a feedback loop 320 that applies a constant current to the photodiode 302, only when the output voltage 332 is below a predetermined reference voltage 331 in order to reduce the sensitivity of the photodiode response at lower light intensity levels. To accomplish this, the feedback loop 320 comprises a voltage comparator 330 electrically connected to the photodiode 302 and to a predetermined reference voltage 331. The voltage comparator 330 is adapted to receive the electric voltage 332 output from the photodiode 302 and to compare the voltage 332 with the predetermined reference voltage 331. That is, the voltage comparator 330 is adapted to determine whether or not the output voltage 332 from the photodiode 302 is less than the predetermined reference voltage 331. Thus, this voltage comparator 330 can be any suitable circuit capable of comparing two voltages and adjusting its output 334 to indicate which is larger or smaller. For example, the voltage comparator 330 can comprise a standard op-amp. Alternatively, the voltage comparator 330 can comprise a dedicated circuit, such as the exemplary circuit illustrated in FIG. 4, in which the reference voltage ($V_r$) is approximately equal to the threshold voltage ($V_t$) of the device and in which the reset is common with the photodiode reset.

Figure 5:
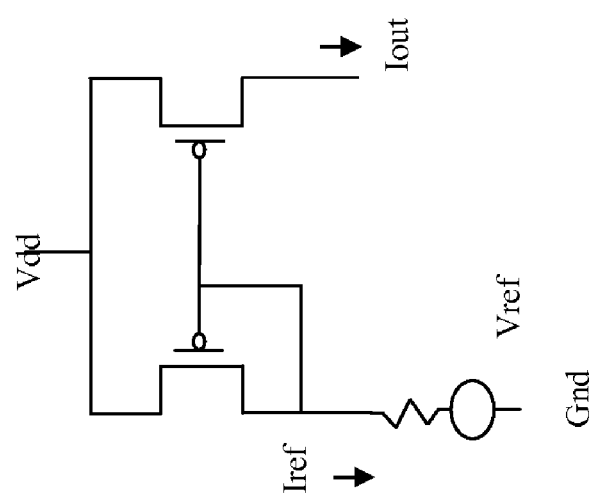
FIG. 5 is a schematic diagram illustrating an exemplary current source that can be incorporated into the imaging circuit of FIG. 3.

The feedback loop 320 further comprises a current source 340 connected to the photodiode 302 by a switch 350, which in turn is controlled by the output 334 of the comparator 330. The current source 340 can comprise any circuit capable of supplying a constant current on demand to the photodiode 302. For example, the current source 340 can comprise a current mirror, as illustrated in FIG. 5. The switch 350 can comprise a field effect transistor, or any other suitable device adapted to control (i.e. allow or prevent) the flow of the constant current from the current source 340 to the photodiode 302.

Figure 6:
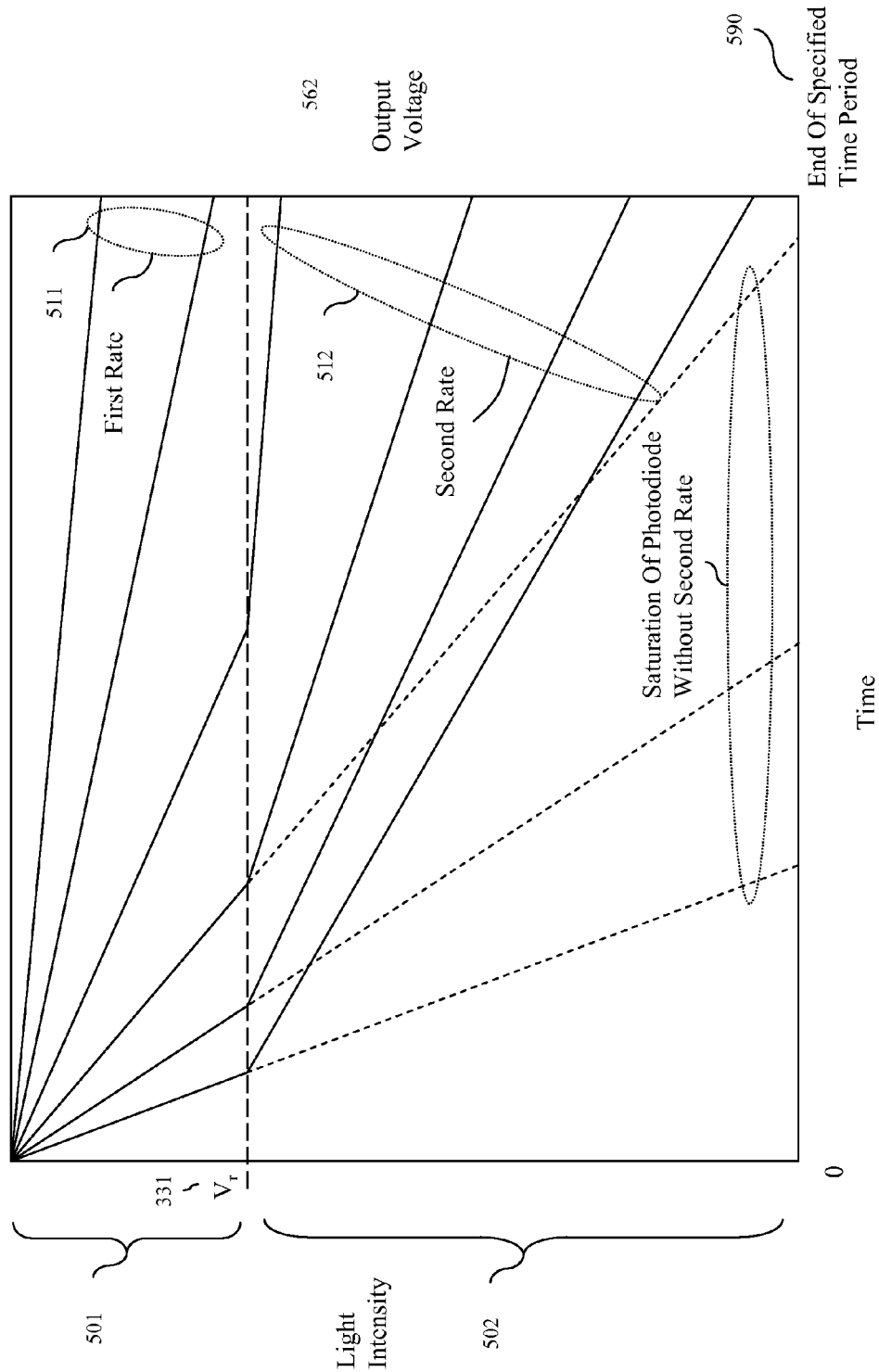
FIG. 6 is chart illustrating the extended dynamic range of the imaging circuit of FIG. 3.

Specifically, if the switch 350 is turned on the constant current will be supplied to the photodiode 302 and if the switch 350 remains off no current will be supplied to the photodiode 302. Thus, referring to FIG. 6, if the output voltage 332 of the photodiode 302 is determined by the comparator 330, during the specified period of time (i.e., during the integration period determine by the preset shutter speed), to be at or above the reference voltage 331, the switch 350 will remain off preventing a constant current from flowing from the current source 340 to the photodiode 302. Without the constant current, the photodiode 302 will reduce the output voltage 332 in response to the intensity of the light energy at a first rate 511 (i.e., the photodiode will discharge at a first rate). However, if the output voltage 332 of the photodiode 302 is determined by the comparator 330 to be below the reference voltage 331, the switch 350 will turn on allowing a constant current to flow from the current source 340 to the photodiode 302. With the constant current, the photodiode 302 rate of discharge due to photon flux is reduced. Thus, the photodiode 302 will reduce the output voltage 332 in response to the intensity of the light energy at a second rate 512 that is different from the first rate 511 and, more specifically, that is less than the first rate 511. Consequently, the sensitivity of the photodiode 302 is greater within a first range 501 of light intensities (i.e., to lower light intensity levels) than within a second range 502 of light intensities that is greater than the first range (i.e., to higher light intensity levels). That is, the sensitivity of the photodiode is reduced with higher light intensities. This second rate 512 prevents saturation of the photodiode 302 within the second range 502 of light intensities during the specified period of time 590 (i.e., during the integration period determine by the preset shutter speed).

Figure 7:
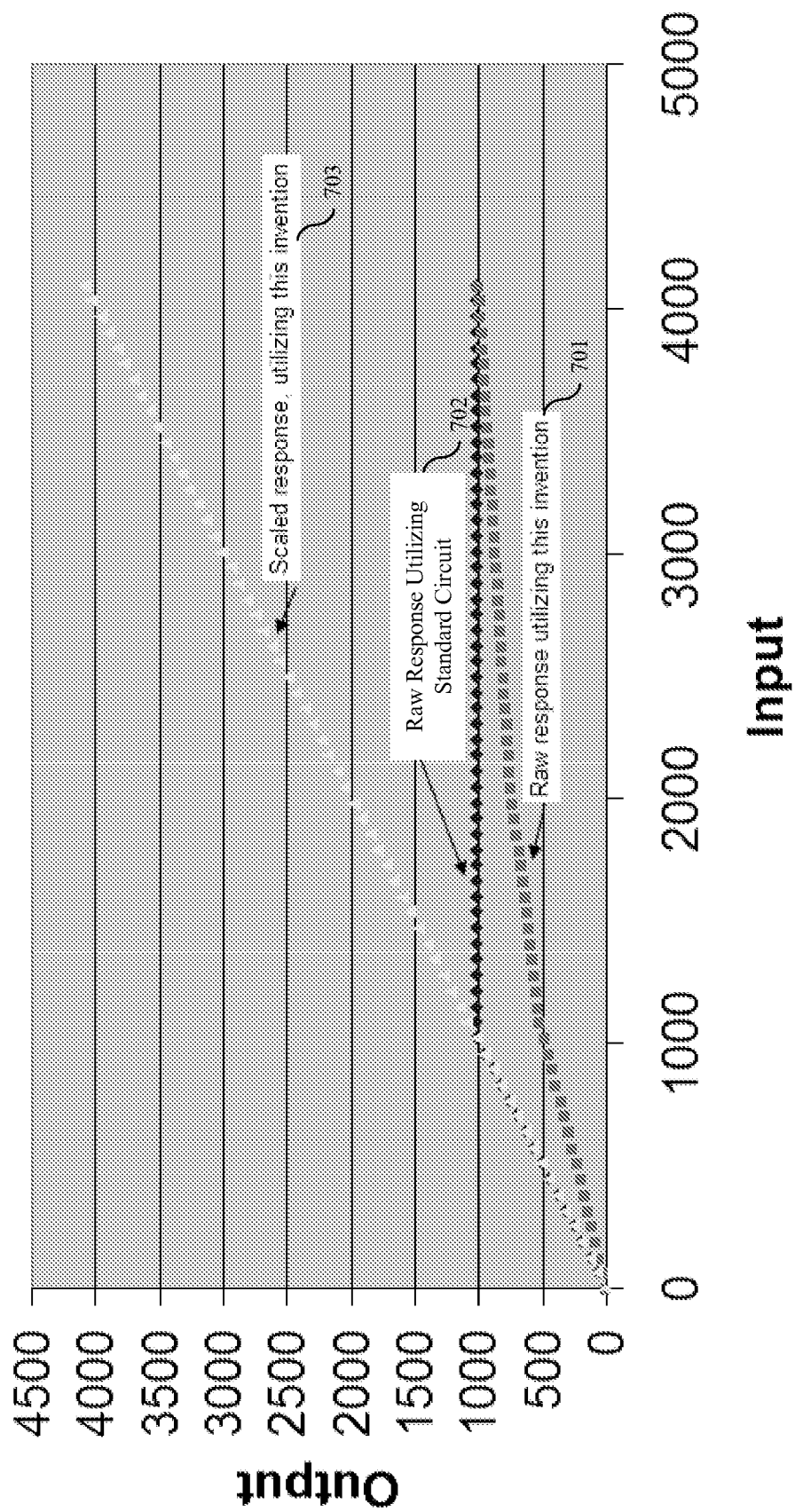
FIG. 7 is a chart comparing simulated response of the imaging circuit 100 of FIG. 1, the simulated response of the imaging circuit 300 of FIG. 3 and the scaled response of the imaging circuit 300 of FIG. 3.

In addition to the features described above, the imaging circuit 300 can be configured with a photodiode 302 that exhibits a predetermined (i.e., known, selected, etc.) rate of discharge (i.e., the first rate) and, more specifically, that exhibits a predetermined rate of discharge that is lower than the rate of discharge of the light energy. This will ensure that, once the switch 350 is turned on by the comparator 340 allowing current to flow from the current source 340 to the photodiode 302, it will remain on. Furthermore, while the current applied to the photodiode 302 by the feedback loop 320 and, particularly, by the current source 340 must be constant, the current source 340 itself can be variable. That is, the current source 340 can be configured to allow adjustment (either manually or automatically) to any specific pre-set constant current level, based on known lighting conditions or based on light metering. Such a variable current source allows the second rate to be adjusted, as needed. Practically, the current value for the current sources 340 in each imaging circuit in an array of imaging circuits within a digital camera would be set globally (e.g., based on the known lighting conditions or through light metering). However, those skilled in the art will recognize that architectures could be configured to enable local or pixel-level control of current source current values to further optimize the dynamic range of the imaging chip to specific scenes. Finally, operation of circuit 300 is deterministic, in that it is only necessary to read out the final voltage of each photodiode. However, post processing of this data is necessary. For example, a processor (not sown) can be in communication with the imaging circuit 300 and can be adapted to apply a simple interpolation (e.g., Y=MX+B, where M and B are set algorithmically in accordance with the integration time utilized and the corresponding current source setting). This interpolation normalizes (i.e., scales) the response of the imaging circuit 300 in the event that the second rate 512 is employed. As illustrated graphically in FIG. 7, the raw response 701 of the imaging circuit 300 would be within the same voltage range as the raw response 702 of a conventional imaging circuit (e.g., imaging circuit 100 of FIG. 1). However, as further illustrated in FIG. 7, the scaled response 703 extends the effective response range (i.e., the dynamic range) of the image circuit 300.

It should be noted that the feedback loop 320 is described above and illustrated in FIG. 3 as being connected to a single photodiode 302 in a single imaging circuit 300. However, in an alternative embodiment of the present invention, the feedback loop 320 may be connected to more than photodiode 320 (e.g., a grouping of adjacent photodiodes). In this case the, the comparator 330 would be adapted to turn on the switch 350 allowing current to flow from a current source to each of the multiple photodiodes only if preset conditions are met (e.g., if all of the photodiodes have output voltages that are greater than the reference voltage, if most of the photodiodes have output voltages that are greater than the reference voltage, if any one of the photodiodes has an output voltage that is greater than the reference voltage, etc.).

Figure 8:
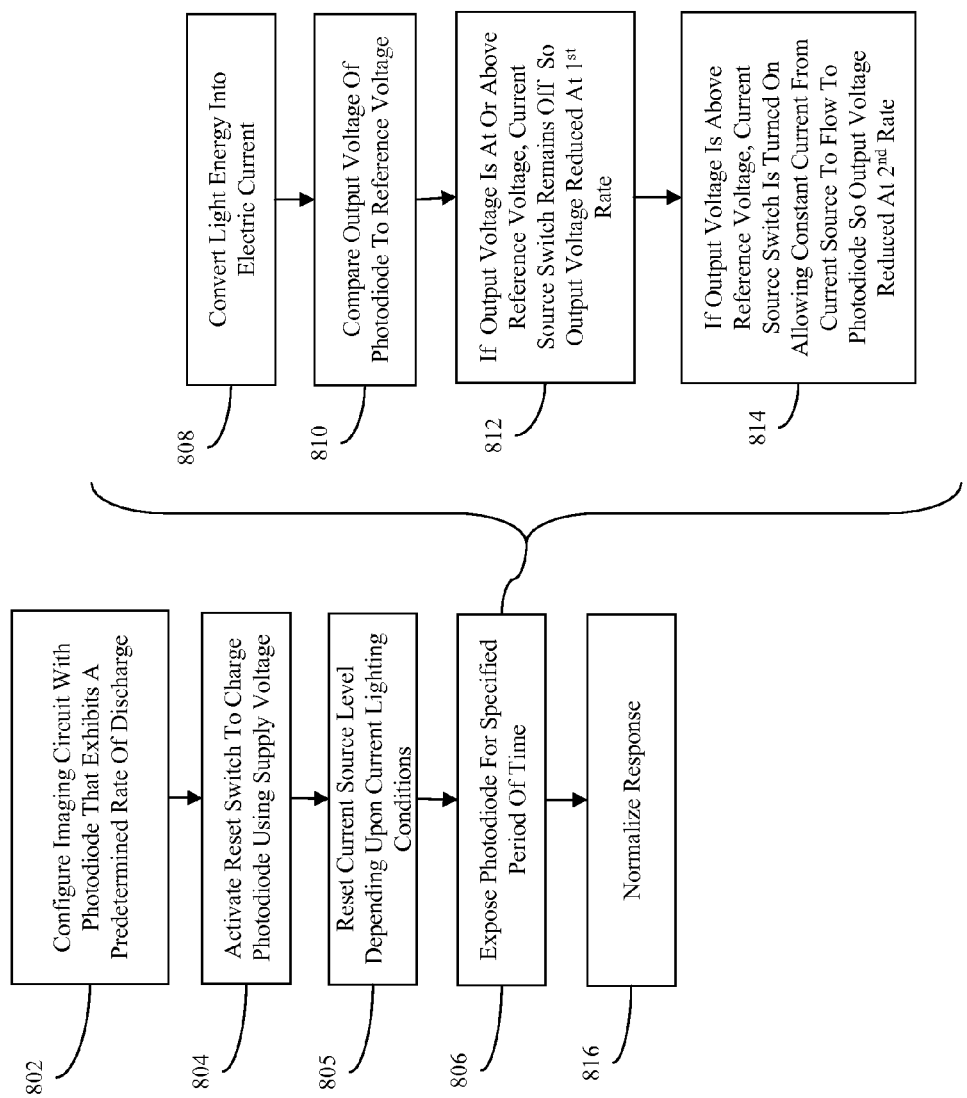
FIG. 8 is a flow diagram illustrating an embodiment of the imaging method of the present invention.

Referring to FIG. 8 in combination with FIG. 3, also disclosed herein are embodiments of an associated imaging method. The method embodiments comprise converting, by a photodiode 302, light energy into electric current over a specified period of time. Specifically, a reset switch 304 is activated to allow a supply voltage 303 to charge the photodiode 302 (804). The reset switch 304 is then turned off and the photodiode 302 is exposed to light energy over a specified period of time (i.e., over the integration period established by a preset camera shutter speed). During this integration period, light exposure discharges the photodiode 302 and the resulting output voltage 332 is inversely proportional to the integrated intensity of that light energy (808). Furthermore, during the integration period, the output voltage 332 of the photodiode is compared, by a voltage comparator 330, to a predetermined reference voltage 331 in order to determine whether the output voltage 332 is less than the predetermined reference voltage 332. Finally, during the integration period, when and only when the output voltage 332 is less than the predetermined reference voltage 331, is a constant current applied, by a current source 340, to the photodiode 302 (812-814). Without this constant current, the output voltage 332 will be reduced in response to the intensity of the light energy at a first rate. However, with the constant current, the output voltage 332 will be reduced in response to the intensity of the light energy at a second rate that is different from the first rate and, more specifically, that is less than the first rate. Consequently, the method provides for greater sensitivity within a first range of light intensities (i.e., to lower light intensities) than within a second range of light intensities that is greater than the first range (i.e., to higher light intensities). That is, the sensitivity of the photodiode is reduced with higher light intensities. This second rate prevents saturation of the photodiode within the second range of light intensities during the specified period of time.

The method embodiments can include several additional features. For example, the method embodiments can include configuring the imaging circuit 300 with a photodiode 302 that exhibits a predetermine rate of discharge (i.e., the first rate) and, specifically, a predetermined rate of discharge that is lower than a rate of discharge of the light energy to ensure that, once the constant current flows to the photodiode, the output voltage will remain below the predetermined reference voltage (802). The method embodiments can further include automatically or manually pre-setting constant current to a specified level based on known lighting conditions or based on light metering (805). Adjusting the value of the current level allows the second rate to be adjusted. Finally, as discussed in detail above and illustrated in FIG. 7, after the specified period of time (i.e., after the integration period), post-processing is necessary to normalize (i.e., scale) the response of the imaging circuit 300 in the event that the second rate is employed (816). For example, a simple interpolation (e.g., Y=MX+B, where M and B are set algorithmically in accordance with the integration time utilized and the corresponding current source setting) can be applied to the actual photodiode response.

Figure 9:
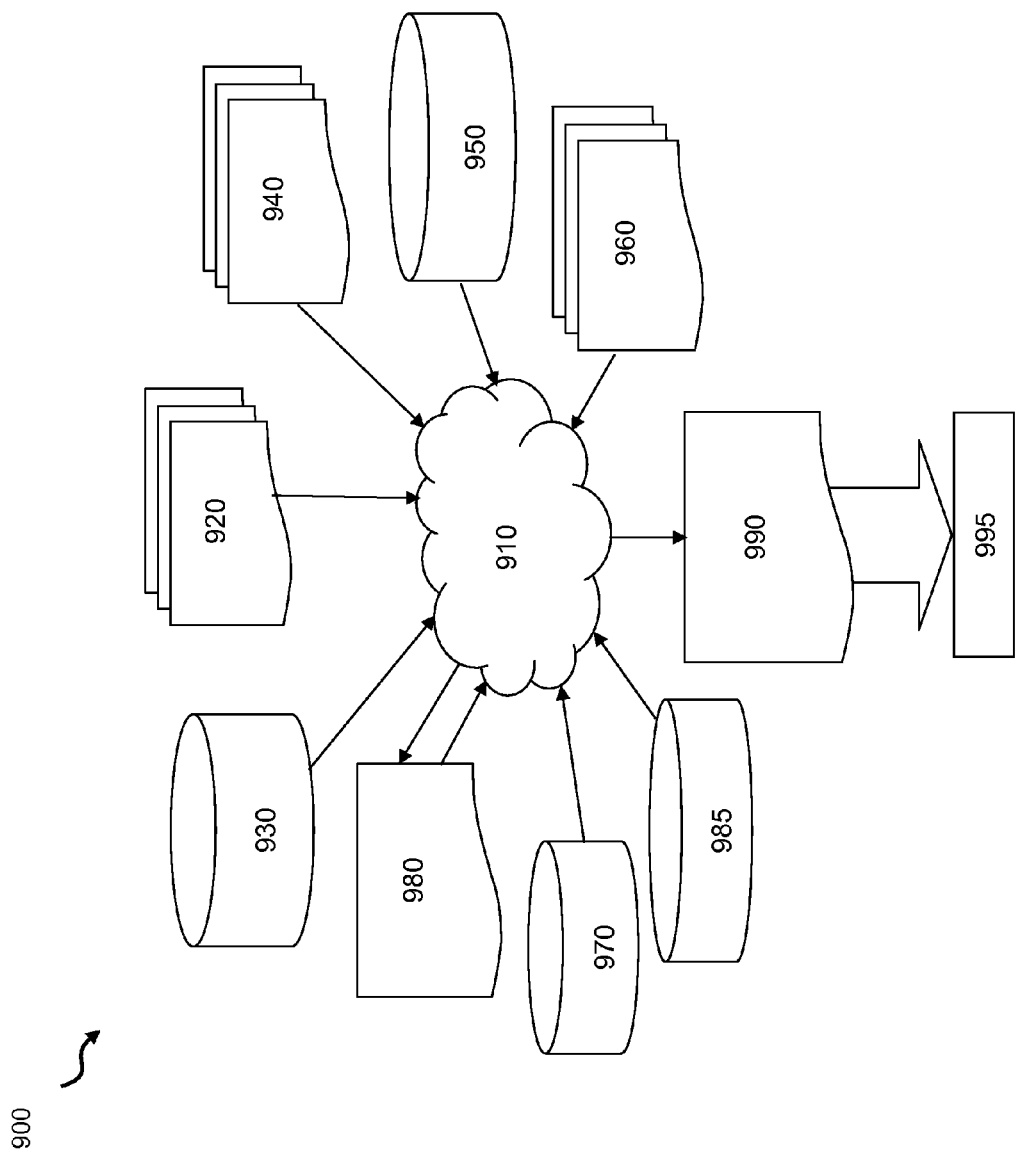
FIG. 9 is a flow diagram of a design process used in semiconductor design, manufacture, and/or test.

Also disclosed herein are embodiments of a design structure embodied in a machine readable medium and used in a design process for designing the above-described imaging circuit. Specifically, FIG. 9 shows a block diagram of an exemplary design flow 900 used for example, in semiconductor design, manufacturing, and/or test. Design flow 900 may vary depending on the type of IC being designed. For example, a design flow 900 for building an application specific IC (ASIC) may differ from a design flow 900 for designing a standard component. Design structure 920 is preferably an input to a design process 910 and may come from an IP provider, a core developer, or other design company or may be generated by the operator of the design flow, or from other sources. Design structure 920 comprises an embodiment of the imaging circuit 300 of the invention as shown in FIG. 3 in the form of schematics or HDL, a hardware-description language (e.g., Verilog, VHDL, C, etc.). Design structure 920 may be contained on one or more machine readable medium. For example, design structure 920 may be a text file or a graphical representation of an embodiment of the imaging circuit 300 of the invention as shown in FIG. 3. Design process 910 preferably synthesizes (or translates) an embodiment of the imaging circuit 300 of the invention as shown in FIG. 3 into a netlist 980, where netlist 980 is, for example, a list of wires, transistors, logic gates, control circuits, I/O, models, etc. that describes the connections to other elements and circuits in an integrated circuit design and recorded on at least one of machine readable medium. For example, the medium may be a CD, a compact flash, other flash memory, a packet of data to be sent via the Internet, or other networking suitable means. The synthesis may be an iterative process in which netlist 980 is resynthesized one or more times depending on design specifications and parameters for the circuit.

Design process 910 may include using a variety of inputs; for example, inputs from library elements 930 which may house a set of commonly used elements, circuits, and devices, including models, layouts, and symbolic representations, for a given manufacturing technology (e.g., different technology nodes, 32 nm, 45 nm, 90 nm, etc.), design specifications 940, characterization data 950, verification data 960, design rules 970, and test data files 985 (which may include test patterns and other testing information). Design process 910 may further include, for example, standard circuit design processes such as timing analysis, verification, design rule checking, place and route operations, etc. One of ordinary skill in the art of integrated circuit design can appreciate the extent of possible electronic design automation tools and applications used in design process 910 without deviating from the scope and spirit of the invention. The design structure of the invention is not limited to any specific design flow.

Design process 910 preferably translates an embodiment of the imaging circuit 300 of the invention as shown in FIG. 3, along with any additional integrated circuit design or data (if applicable), into a second design structure 990. Design structure 990 resides on a storage medium in a data format used for the exchange of layout data of integrated circuits and/or symbolic data format (e.g. information stored in a GDSII (GDS2), GL1, OASIS, map files, or any other suitable format for storing such design structures). Design structure 990 may comprise information such as, for example, symbolic data, map files, test data files, design content files, manufacturing data, layout parameters, wires, levels of metal, vias, shapes, data for routing through the manufacturing line, and any other data required by a semiconductor manufacturer to produce an embodiment of the imaging circuit 300 of the invention as shown in FIG. 3. Design structure 990 may then proceed to a stage 995 where, for example, design structure 990: proceeds to tape-out, is released to manufacturing, is released to a mask house, is sent to another design house, is sent back to the customer, etc.

Therefore, disclosed above are embodiments of a pixel imaging circuit that incorporates a standard photodiode. However, the imaging circuit is modified with a feedback loop to provide a first photo response over a first portion of the light sensing range (e.g., at lower light intensity range) and a second reduced-sensitivity photo response over a second portion of the light sensing range (i.e., at a higher light intensity range), thereby extending the circuits dynamic range of coverage. This approach expands the dynamic range of prior art imaging sensors and further has many potential advantages over prior art logarithmic sensors because the response characteristics can be better controlled, thereby reducing overhead for calibration and post processing of the image data to derive the final output image data. Also disclosed are embodiments of an associated imaging method and a design structure that is embodied in a machine readable medium and used in the imaging circuit design process.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of embodiments, those skilled in the art will recognize that these can be practiced with modification within the spirit and scope of the appended claims.

What is claimed is:

1. An imaging circuit comprising:
a photodiode adapted to convert light energy into electric current, wherein an output voltage of said photodiode is inversely proportional to an intensity of said light energy over an integration period; and
a feedback loop adapted to apply a constant current to said photodiode only when said output voltage is below a predetermined reference voltage,
wherein, without said constant current, said photodiode reduces said output voltage in response to said intensity of said light energy at a first rate and, with said constant current, said photodiode reduces said output voltage in response to said intensity of said light energy at a second rate that is different from said first rate.

2. The imaging circuit according to claim 1, wherein said feedback loop comprises:
a comparator adapted to receive said output voltage from said photodiode and to determine whether said output voltage is less than said predetermined reference voltage; and a current source electrically connected to said photodiode by a switch, wherein said comparator is adapted to control said switch such that, when said output voltage is at or greater than said predetermined reference voltage, said switch remains off preventing said constant current from flowing to said photodiode and such that, when said output voltage is less than said predetermined reference voltage, said switch turns on allowing said constant current to flow to said photodiode.

3. The imaging circuit according to claim 1, wherein said second rate is less than said first rate such that sensitivity of said photodiode is greater within a first range of light intensities than within a second range of light intensities that is greater than said first range.

4. The imaging circuit according to claim 3, wherein said second rate prevents saturation of said photodiode within said second range of light intensities during said integration period.

5. The imaging circuit according to claim 2, wherein said current source is adapted to allow a specific constant current to be pre-set based on one of known lighting conditions and light metering.

6. The imaging circuit according to claim 1, further comprising a supply voltage, for charging said photodiode, electrically connected to said photodiode by a reset switch.

7. The imaging circuit according to claim 1, wherein said first rate is lower than a rate of discharge of said light energy such that, once said constant current flows to said photodiode, said output voltage will remain below said predetermined reference voltage.

8. An imaging method comprising:
  converting light energy into electric current using a photodiode such that an output voltage of said photodiode is inversely proportional to an intensity of said light energy over an integration period;
  determining whether said output voltage is less than a predetermined reference voltage; and
  applying a constant current to said photodiode only when said output voltage is less than said predetermined reference voltage using a feedback loop,
wherein, without said constant current, said photodiode reduces said output voltage in response to said intensity of said light energy at a first rate and, with said constant current, said photodiode reduces said output voltage in response to said intensity of said light energy at a second rate that is different from said first rate.

9. The method according to claim 8, wherein said second rate is less than said first rate so as to provide greater sensitivity within a first range of light intensities than within a second range of light intensities that is greater than said first range.

10. The method according to claim 9, wherein said second rate prevents saturation of said photodiode within said second range of light intensities during said specified period of time.

11. The method according to claim 8, further comprising, before said converting, activating a reset switch to allow a supply voltage to charge said photodiode.

12. The method according to claim 8, further comprising pre-selecting said photodiode so that said first rate is lower than a rate of discharge of said light energy to ensure that, once said constant current flows to said photodiode, said output voltage will remain below said predetermined reference voltage.

13. The method according to claim 8, pre-setting a number of amps of said constant current based on known lighting conditions.

14. The method according to claim 8, further comprising, after said integration period, applying a simple interpolation to normalize said output voltage when said output voltage is reduced at said second rate.

15. A design structure embodied in a non-transitory machine readable medium, said design structure comprising:
  a photodiode adapted to convert light energy into electric current, wherein an output voltage of said photodiode is inversely proportional to an intensity of said light energy over an integration period; and
  a feedback loop adapted to apply a constant current to said photodiode only when said output voltage is below a predetermined reference voltage,
wherein, without said constant current, said photodiode reduces said output voltage in response to said intensity of said light energy at a first rate and, with said constant current, said photodiode reduces said output voltage in response to said intensity of said light energy at a second rate that is different from said first rate.

16. The design structure according to claim 15, wherein said design structure comprises a netlist.

17. The design structure according to claim 15, wherein said design structure resides on storage medium as a data format used for the exchange of layout data of integrated circuits.

18. The design structure according to claim 15, wherein said feedback loop comprises:
  a comparator adapted to receive said output voltage from said photodiode and to determine whether said output voltage is less than said predetermined reference voltage; and
  a current source electrically connected to said photodiode by a switch,
  wherein said comparator is adapted to control said switch such that, when said output voltage is at or greater than said predetermined reference voltage, said switch remains off preventing said constant current from flowing to said photodiode and such that, when said output voltage is less than said predetermined reference voltage, said switch turns on allowing said constant current to flow to said photodiode.

19. The design structure according to claim 15, wherein said second rate is less than said first rate such that sensitivity of said photodiode is greater within a first range of light intensities than within a second range of light intensities that is greater than said first range.

20. The design structure according to claim 18, wherein said current source is adapted to allow a specific constant current to be pre-set based on one of known lighting conditions and light metering.

* * * * *